Nov. 21, 1950

J. G. KREER, JR 2,530,528

PHASE COMPARATOR FOR UNDERWATER SIGNALING

Filed Nov. 1, 1944

INVENTOR
J. G. KREER, JR.
BY
B. C. Seger
ATTORNEY

Nov. 21, 1950  J. G. KREER, JR  2,530,528
PHASE COMPARATOR FOR UNDERWATER SIGNALING
Filed Nov. 1, 1944  3 Sheets-Sheet 2
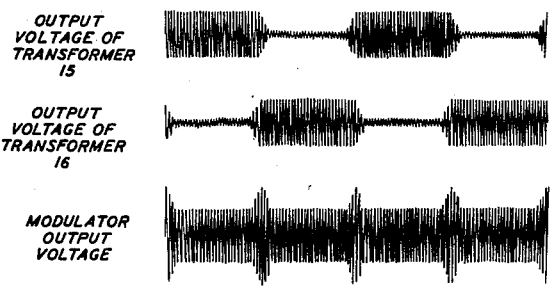
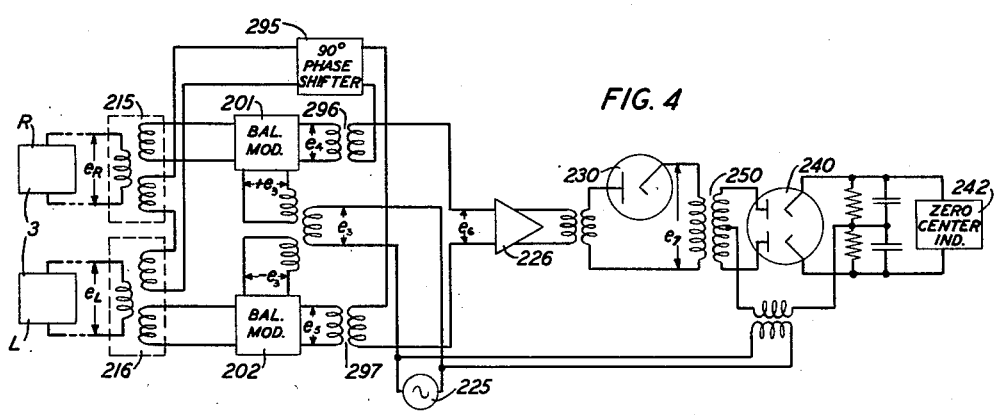
FIG. 4
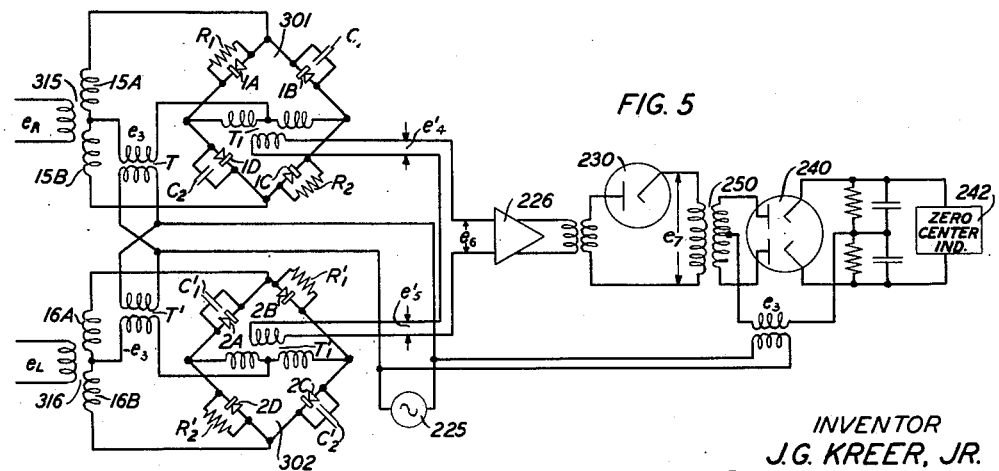
FIG. 5
INVENTOR
J.G. KREER, JR.
BY
B. C. Leger
ATTORNEY

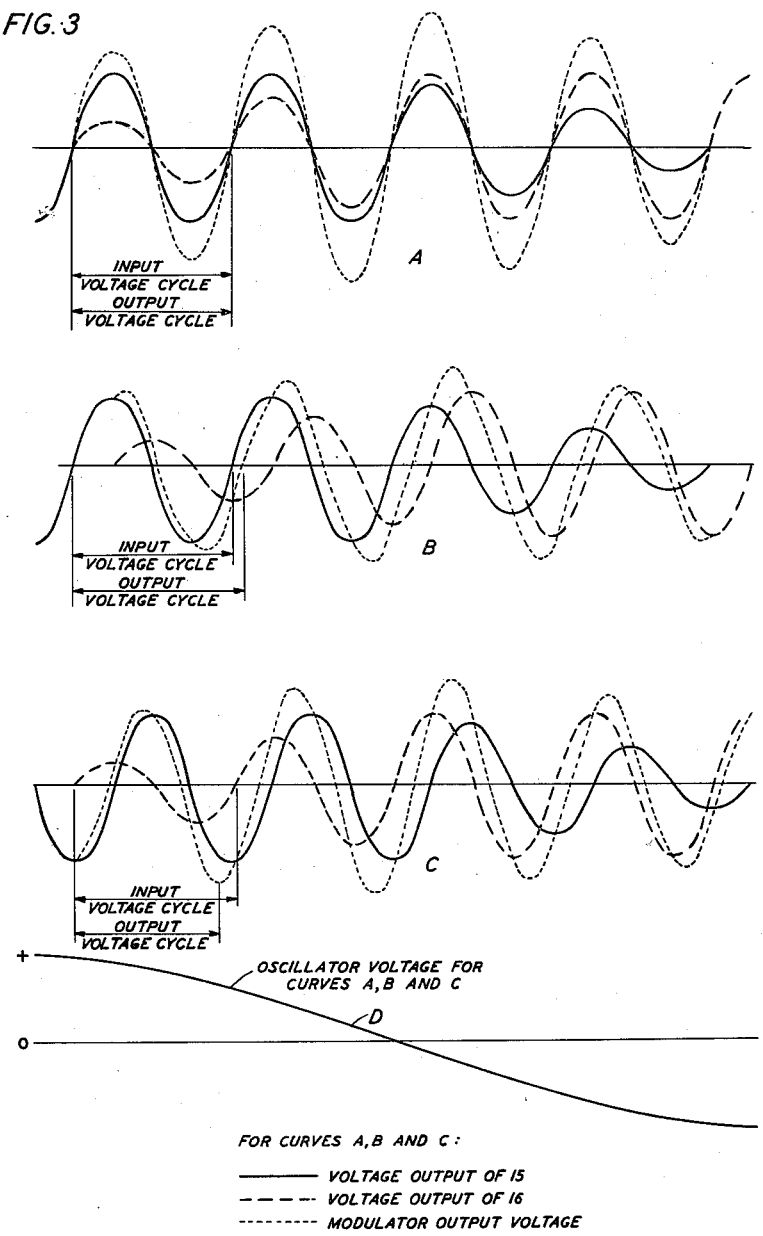

Patented Nov. 21, 1950

2,530,528

UNITED STATES PATENT OFFICE 2,530,528

PHASE COMPARATOR FOR UNDERWATER SIGNALING

John G. Kreer, Jr., Bloomfield, N. J., assignor to Bell Telephone Laboratories, Incorporated, New York, N. Y., a corporation of New York Application November 1, 1944, Serial No. 561,448

2 Claims. (Cl. 172—245)

This invention relates to location of objects.

A purpose of the invention is to ascertain the direction of a distant object from a reference point.

This may be done by receiving a signal wave from the object in each of a pair of directional receivers mounted, for example, side by side near the reference point, which may be a point midway between the receivers, and deriving the desired direction indication from $\theta$, the phase difference of the wave at the two receivers.

The receivers may be, for example, hydrophones on a surface vessel; and the object may be, for example, a submerged or partly submerged object, as for instance an enemy submarine. Then the received signal wave may be, for example, an echo or reflection from the distant object of an underwater supersonic signal wave originated on the surface vessel and directionally transmitted from it as a short wave-train.

The phase angle $\theta$ is dependent in magnitude and sign on the direction, from the reference point, of the submarine or object from which the wave is received. The receivers are of such design that there is a unique correspondence between $\theta$ and the orientation angle of the receivers with respect to this direction, (i. e., with respect to the direction from which the echo or signal wave approaches the reference point), at least when such orientation angle is contained within the principal lobe of the directional response pattern of the receiver system. Outside this lobe the sensitivity of the pick-up is so small as to make the probability of confusion negligible. The receivers may be rotatable together in azimuth, about the reference point, so that they can be trained on the object, to make the value of $\theta$ zero. If they are trained to the right or left of the object, $\theta$ will differ from zero. Means may be provided for deriving from the received waves a voltage which is an odd function of $\theta$; and this voltage may be utilized to obtain an indication of whether the receivers are trained directly on the object, or to the right of the object, or to the left of the object.

In accordance with a feature of the invention, the means for deriving the desired voltage which is an odd function of $\theta$ comprises a variable impedance modulator to which are applied the outputs of the receivers and a wave of modulating frequency to produce a frequency modulated wave, and frequency demodulating means for deriving the desired voltage from the frequency modulated wave.

In underwater echo ranging considerable difficulty is encountered in determining the bearing of the target by the usual method which involves determination of the orientation of the receiver at which maximum echo is received, inasmuch as successive wave trains or "pings" produce echoes that may vary as much as 20 decibels, for example.

Therefore, an object of the invention is to provide means for determining the bearing from the phase parameter of the signal, independently of the amplitude of the signal.

Other objects and features of the invention will be apparent from the following description and claims:

Figs. 2 and 3 show voltage diagrams explanatory of the operation of the system of Fig. 1; and Figs. 4 and 5 show modifications of the system of Fig. 1.

Figure 1:
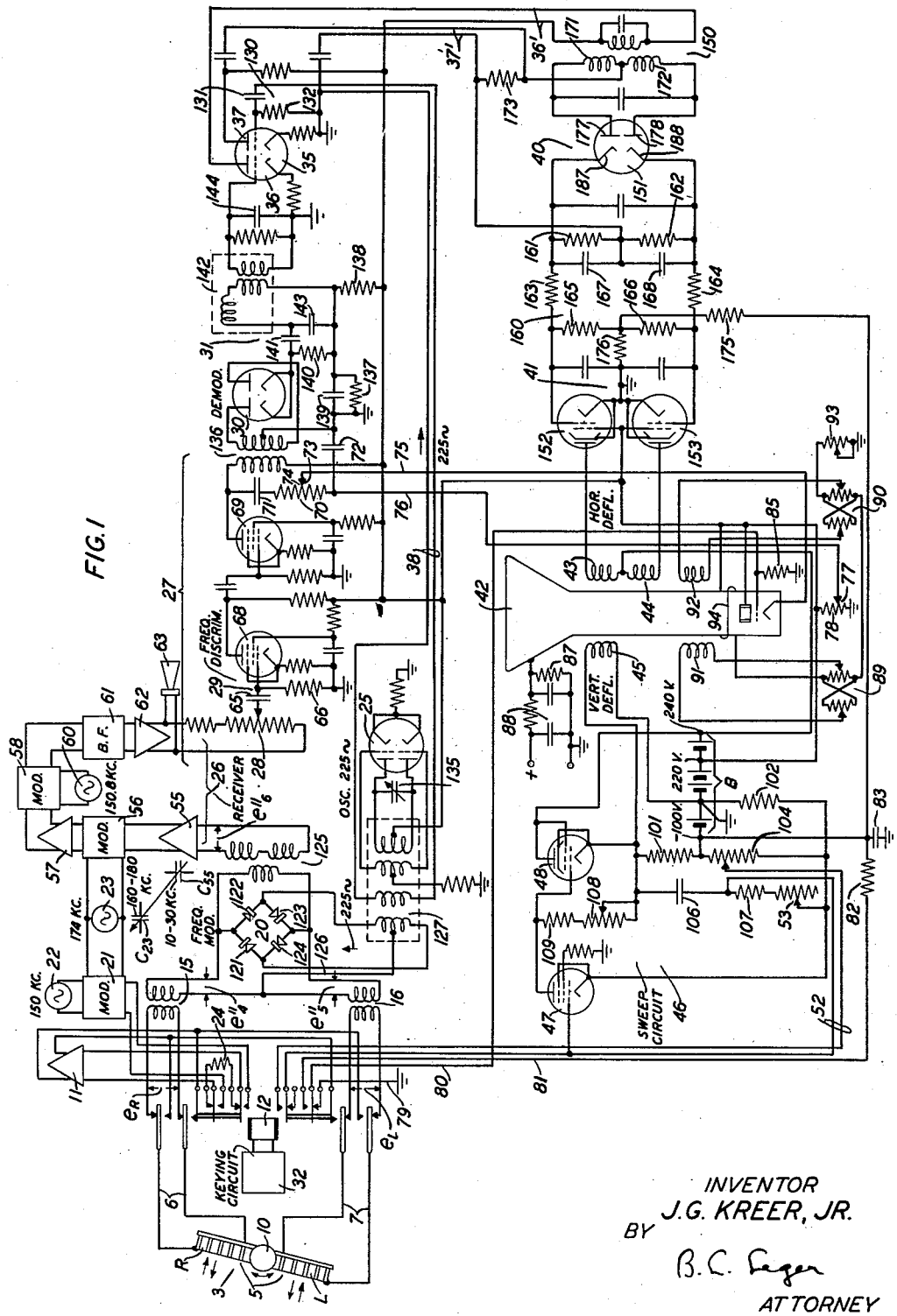
Fig. 1 is a circuit diagram of a system embodying one form of the invention.

Fig. 1 shows a direction indicator circuit or bearing deviation indicator circuit embodying a specific form of the invention suitable for use, for example, with underwater sound echo ranging equipment on a surface vessel. The circuit comprises a projector 3 for transmitting a sound beam and receiving an echo of the sound from a distant object or target, and a cathode-ray oscilloscope 42 for indicating the sign, or direction, of the deviation of the pointing, or bearing, of the projector from the bearing or direction of the target. The projector or transceiver 3 may be, for example, a crystal type of projector, such, for instance, as that disclosed in Arthur C. Keller Patent 2,417,830, March 25, 1947 for Compressional Wave Signaling Device. Its right and left halves R and L are two receivers or hydrophones adapted to receive an echo from an enemy submarine or other submerged or partly submerged distant object or target (not shown).

The projector sends out a signal wave to be reflected or echoed from the target and thereafter received by the projector serving as echo receiving means. Each of the projector halves comprises a crystal array, and electromechanical action of the crystals translates the received sound into electrical energy. The projector face is indicated at 5. It may be about ten inches in diameter, for example, and is a vertical plane surface which projects the sound wave and is presented to the echo. The projector is suspended below the ship's keel, from the lower end of the projector training shaft 10. This is a vertical shaft to which the projector is attached and by which the projector may be rotated clockwise and counter-clockwise, in azimuth, to change the projector bearing, i. e., the direction in which the projector faces. The extended axis of the shaft 10 passes between R and L and through the center of the projector face.

The projector transmits into the water a pulse or short wave-train of sound of a frequency of 24 kilocycles per second, for example, translating electrical energy of that frequency received from driver amplifier 11 into the sound energy and emitting the sound into the water in a unidirectional beam. For this transmission, a relay 12 is operated to connect the output of the amplifier to the two halves of the projector in parallel. Immediately after the transmission of the short pulse into the water, the relay is de-energized, to disconnect the projector from the amplifier and connect R and L to input transformers 15 and 16 respectively of an input modulator 20, so that when the transmitted sound pulse strikes a submerged object and a portion of the sound is reflected from the object as an echo and is picked up as such by the projector and translated into electrical energy by the projector, this electrical energy is fed to the modulator 20 for utilization in determining the direction of the object as indicated hereinafter.

In sending and in receiving, the projector is highly directional and may be highly efficient over a frequency range of 22 to 28 kilocycles per second, for example. In sending, it transmits the sound pulses into the water in a beam pattern with the direction of the highest intensity perpendicular to the projector face, the intensity decreasing rapidly on either side and being small or negligible at the rear; and in receiving its response is correspondingly directional.

The circuits 6 and 7 from the halves of the projector to the switching elements of relay 12 may conveniently be made through slip rings (not shown), carried by the shaft 10, and transformers (not shown) may match the impedances of the crystal arrays to the impedances of circuits 6 and 7. The shaft can be rotated to orient the projector in azimuth, clockwise and counter-clockwise, to search for a target. When the projector is trained on the target, the echo received by the two halves of the projector will have substantially no difference in phase at the two halves. On the other hand, when the projector is trained to the right or left of the target, the phase of the received echo at the projector half R will differ from the phase of the received echo at the projector half L, the magnitude and sign of the phase difference depending on the magnitude and sign, respectively, of the angle representing the deviation of the bearing of the projector from the bearing of the target, i. e., the angle between a vertical plane normal to the projector face and the vertical plane passing through the target and the center of the projector face. The arrangement of the system may be, for example, such that one degree change in projector bearing produces 15 degrees change in phase difference between the two projector output voltages. Then the maximum usable angle of projector bearing deviation in determining the bearing of the target from the phase difference between the two projector output voltages may be about 6 degrees which produces a change of about 90 degrees in that phase difference.

When the projector is pointed directly at the distant reflecting object the echo will be strongest and moreover, as explained hereinafter will not cause the cathode-ray spot on the screen of the oscilloscope 42 to move appreciably to the right or left. When the projector is trained to the right or left of the distant object the length of the path of the received echo is unequal for the two halves of the projector, which results in a difference in phase of their electrical outputs. These outputs are compared as indicated hereinafter, being utilized to cause the oscilloscope spot to move to the left or right and thereby indicate whether the bearing of the distant object is to the left or right of that of the projector. By repeatedly projecting sound pulses and successively observing the strength of echoes received and also the changes in the amplitude and direction of the deflection of the oscilloscope spot, with changes in bearing of the projector, the direction of the distant object may be determined, and followed if the target is moving. As explained hereinafter, the strength of the echoes received may be observed, for example, aurally by means comprising a receiver circuit 26 and loudspeaker 53.

The driver amplifier 11 receives its 24-kilocycle input from a modulator 21, which produces a 24-kilocycle wave by combining the 150-kilocycle output wave from driver oscillator 22 with a 174-kilocycle output wave from oscillator 23.

The relay 12 may be operated by a keying circuit 32 which controls the current through the relay winding. When the relay is in the non-operated position so contacts connect R and L to 15 and 16, another set of its contacts connects a terminating resistor 24 across the input of the driver amplifier 11 to prevent it from singing. When the relay is operated by the keying circuit so R and L are disconnected from 15 to 16 and connected in parallel to the output of the driver amplifier, in sequence the terminating resistor 24 is removed from the driver amplifier input and the driver amplifier input is connected to the modulator 21. With this sequence of switching, the changeover is accomplished when currents flowing through the relay contacts are low.

The circuit of Fig. 1 comprises: a push-pull oscillator 25 whose frequency may be nominally 225 cycles per second, for example, but may be slightly adjustable for a purpose disclosed hereinafter; a receiver circuit 26 fed from modulator 20 and feeding a two-stage audio frequency amplifier 27 including a gain adjusting potentiometer 28 and a frequency discriminator 29; a detector or amplitude demodulator 30 fed from amplifier 27 and including a band-pass output filter 31; an amplifier tube 35 comprising a buffer amplifier section 36 fed from filter 31 and a second buffer amplifier section 37 fed from the oscillator 25 through conductors 38; a rectifier 40 having conjugate inputs from the buffer amplifiers 36 and 37, the input from amplifier 36 being applied through conductors 36' and the input from amplifier 37 being applied through conductors 37'; a balanced direct current amplifier 41 fed from the rectifier 40; a cathode-ray oscilloscope 42 having its horizontal deflection coils 43 and 44 fed from amplifier 41 and having its vertical deflection coil 45 fed from a sweep circuit 46, the circuit 46 including amplifier tubes 47 and 48 and being controlled by the relay 12 through conductor 52.

As explained hereinafter, the circuit 46 causes the cathode-ray spot to sweep vertically from the bottom of the screen to the top, and the signal causes it to be deflected horizontally during this vertical sweep, the horizontal deflection of the spot during its vertical travel providing an indication of the direction of the projector deviation from on-target bearing. As will appear from description hereinafter of operation of the sweep circuit 46, a range rheostat 53 provides for selection of the vertical sweep period. A period is selected that will correspond with the time elapsing between the start of successive pulses or wavetrains of the sound transmitted from the projector, or in other words will correspond with a vertical rate of travel that (for a given sweep amplitude) will depend on the pulsing rate or pulsing frequency, i. e., on the number of pulses or wavetrains transmitted per unit of time. The pulse duration is relatively short. It may be, for example, about 35 milliseconds for target ranges under a few thousand yards, and 150 milliseconds for ranges of five or ten thousand yards. The intervals between pulses may be of the order of one to ten seconds, for example. For instance, they may be about 12.5 seconds for target ranges between 4,500 and 10,000 yards, and 1.25 seconds for target ranges below 1,000 yards, and for intermediate ranges may approximate 1.25 seconds per thousand yards of range. In general, it is desirable to pulse as frequently as the range of the target (i. e., the distance to the target) will permit, and therefore to increase the frequency of the pulsing as the target is approached.

The receiver 26 comprises: an input amplifier 55 fed from the modulator 29; a modulator 56 fed from the amplifier 55 normally tuned to 24 kilocycles, for example, and from the oscillator 23, normally tuned to 174 kilocycles, for example; an amplifier 57 fed from the modulator 56; a modulator 58 fed from the amplifier 57 and from an oscillator 60 whose frequency may be 150.8 kilocycles, for example; a modulator output band filter 61 whose pass-band may extend, for example, from 100 cycles per second to 2,000 cycles per second; and an audio amplifier 62 which may feed a loudspeaker 63 as well as the gain control potentiometer 28 of the audio amplifier 27.

The frequency discriminator 29 comprises condenser 65 and resistor 66, and has attenuation decreasing with frequency increase throughout the frequency range of the output of the receiver 26, to convert the phase modulated output of receiver 26 into an amplitude and phase modulated wave for detection in amplitude demodulator 30.

The audio amplifier 27 includes resistance-capacity coupled tubes 68 and 69. Across the output circuit of tube 69 is a circuit comprising a potentiometer resistance 70 in series with direct current blocking condensers 71 and 72. The resistance 70 and an adjustable contact 73 form a potentiometer 74. When a signal (an echo) is received by projector 3, tube 69 produces an audio frequency voltage across the potentiometer resistance 70. The portion of this voltage appearing between adjustable contact 73 and condenser 72, i. e., the potentiometer output voltage, is introduced in the cathode-grid circuit of the oscilloscope 42. It automatically increases the intensity or brightness of the oscilloscope spot perceptibly during reception of signals.

The cathode-grid circuit of the oscilloscope extends from the cathode of the oscilloscope through conductor 75, contact 73, the lower portion of the potentiometer resistance 70, conductor 76, an adjustable contact 77 of a potentiometer 78, the lower portion of the potentiometer 78, ground, conductor 79, two normally closed contacts of relay 12, and conductor 80, to the oscilloscope grid. In series in this oscilloscope cathode-grid circuit are introduced the voltage across the lower portion of the potentiometer 70 and the voltage across the lower portion of the potentiometer 78. This voltage across the lower portion of the potentiometer 78 is adjustable by the potentiometer contact 77, and is due to current flowing through the potentiometer from the 220-volt terminal of power supply source B. The contact 77 may so adjust the intensity of the spot on the oscilloscope screen that the spot is just perceptible in the absence of signal reception. The power supply source B is shown as a battery for the sake of simplicity, but in practice is ordinarily a rectifier output circuit, and may be any suitable direct current source.

Thus, normally the oscilloscope grid is at ground potential and the cathode is maintained positive with respect to ground by the potentiometer contact 77. By adjusting this contact the bias on the grid may be changed and the intensity of the cathode-ray spot increased or decreased. On receipt of a signal the voltage introduced in the circuit between cathode and ground by potentiometer 74 varies the cathode potential, increasing the brightness of the spot during the alternate half-cycles in which the cathode potential is reduced and thereby causing an apparent brightening of the spot. As will become apparent from description hereinafter of operation of the circuit of Fig. 1, when a signal is received with the projector off-target, due to 225-cycle amplitude modulation appearing in the signal the oscilloscope trace becomes a broken line. The degree of brightening of the oscilloscope spot can be varied by adjusting the potentiometer 74.

During the transmitting condition of the circuit of Fig. 1, relay 12 is operated. When the relay operates, it transfers the oscilloscope grid lead 80 from grounded conductor 79 to a conductor 81 connected through a resistor 82 to the —100-volt terminal of the source B. This applies about —90 volts of bias to the grid, to cut off the cathode-ray and thus extinguish the cathode-ray spot. The resistor 82 protects the —100-volt source, and may have a value of about 70,000 ohms, for example. A filtering or by-pass condenser 83 is shown connected from the —100-volt terminal of the source B to ground.

A resistor 85 connecting the grid of the oscilloscope to ground prevents possibility of the grid being a floating grid. This resistance may have a value of the order of half a megohm, for example.

Plate voltage for the oscilloscope 42 is supplied across resistor 87, from a rectifier (not shown), for example, through a resistance-capacity filter 88. The rectifier may maintain a nominal voltage of 6,000 volts, for example, across the resistance 87. This resistance improves the regulation of the rectifier by helping to keep the load constant, and discharges the high voltage across the condensers of the filter when the alternating current supply to the rectifier is disconnected.

The vertical centering of the cathode-ray is adjusted by a potentiometer 89 and the horizontal centering by the potentiometer 90. Adjustment of these potentiometers varies the current flowing from the 220-volt terminal of source B through the vertical and horizontal centering coils 91 and 92. The potentiometer 89 is set to position the cathode-ray spot normally at the top of the screen. A potentiometer 93 controls the current flowing from the 220-volt terminal of the source B through the focussing coil 94 for the cathode-ray.

For clarity, a specific sweep circuit 46 will be described with constants and operating voltage and currents given concrete values as examples of values that may be used.

Tubes 47 and 48 of the sweep circuit 46 conduct alternately. When relay 12 operates, current from the 240-volt terminal of source B flowing through tube 48 and coil 45 moves the oscilloscope spot swiftly downward. (As indicated above, while the relay is operated, the oscilloscope grid is biased to cut off the cathode-ray, the spot then is not discernible.) When the relay is released, current from the ground terminal of the source B flowing through coil 45 in the opposite direction and through tube 47 moves the spot upward relatively slowly to the top of the screen, with the aid of coil 91.

In this sweep circuit, current flows from the ground terminal of the source B through the deflecting coil 45 and a resistor 101, to the —100-volt terminal of the source B, creating a voltage drop of about 60 volts across resistor 101. Current also flows from the ground terminal of source B through a resistor 102 and through the resistance of a potentiometer 104 to the —100-volt terminal of source B, making the potential of the junction of 102 and 104, and therefore the potential of the cathode of tube 47, about —75 volts (with respect to ground).

In considering operation of the sweep circuit, the starting point may be taken as the instant preceding the operation of the relay 12 to start the next sweep of the oscilloscope spot. At this instant the spot is at the top of the screen and the conductor 52 is open circuited. The tube 47 is in a conducting condition, because the bias on the grid, supplied by condenser 106 as presently will appear, will have been largely dissipated through a series circuit comprising resistor 101, the resistance of potentiometer 104, and a relatively high resistance formed by a resistor 107 and the range rheostat 53. Therefore, due to the voltage drop created across resistor 101 by the current flowing therethrough from coil 45, current is flowing from the junction of coil 45 and resistor 101, through interstage coupling resistors 108 and 109, tube 47, and the resistance of the potentiometer 104, to the —100 volt terminal of the source B. This current flow through 108 and 109 produces a negative bias voltage across the grid and cathode of the tube 48. The value of this voltage will depend on the adjustment of resistor 108 but will usually be 30 volts or more. This voltage cuts off the plate current of the tube 48. The value of the current flowing from the ground terminal of source B through coil 45 and resistor 101 is about 25 milliamperes, which is somewhat less than that needed to move the cathode-ray spot from the center of the screen to the top of the screen. The spot is therefore set at the top of the screen by adjustment of the vertical centering control 89. The junction of the grid of tube 47 and condenser 106 is at about the potential of the junction of resistances 102 and 104, these two junctions being connected through resistances 107 and 53 in series. The tube 47 may be of type 6SJ7GT and the tube 48 of type 6V6GT. The direct current resistance of coil 45 may be 1,200 ohms. The respective values of resistances 101, 102, 104, 107, 108, 109 and 53 may be approximately 2,500 ohms, 15,000 ohms, 2,000 ohms, 91,000 ohms, 50,000 ohms, 27,000 ohms, and 834,000 ohms. The capacitance of condenser 106 may be 1 microfarad.

When the keying circuit 32 operates relay 12, conductor 52 connects the junction point of the grid of tube 47 and condenser 106 to the adjustable contact of potentiometer 104. This makes that junction point more negative with respect to ground, consequently making that junction point substantially negative with respect to the cathode of tube 47, which reduces the current through resistances 108 and 109 and also causes condenser 106 to begin charging, the charging current flowing from the ground terminal of source B through coil 45, condenser 106, conductor 52 and adjustable contact of potentiometer 104 to the —100-volt terminal of source B. The reduction of current through resistances 108 and 109 renders tube 48 conducting, so current flows from the 240-volt terminal of source B through tube 48 and resistor 101 to the —100-volt terminal of source B and thus increases the voltage across 101. The voltage to which the condenser 106 charges when relay 12 operates and also the negative potential which the junction of the grid of tube 47 and condenser 106 assumes with respect to ground and therefore the negative grid-cathode or bias voltage of tube 47 depends on the setting of the contact of potentiometer 104, being greater the nearer the contact is set to the —100-volt terminal of source B. The voltage to which the condenser 106 charges depends, moreover, on the change in voltage across resistor 101 which is due to considerable increase in plate current of tube 48 when the plate current of tube 47 decreases or cuts off. The larger the value of resistance 101, the higher the voltage to which the condenser charges. With the proper setting of the contact of potentiometer 104, the negative bias on the grid of tube 47 will be sufficient to cut off the plate current of tube 47. When this occurs, the bias on the grid of tube 48 is removed. With the consequent sudden drop in the plate-cathode resistance of tube 48, the cathode potential rises above ground potential. In other words, the effect of the plate voltage supplied from the ground and 240-volt terminals of the source B is transferred to coil 45 in the cathode circuit and in coil 45 opposes and exceeds the effect of the voltage supplied from the ground and —100-volt terminals of the source B, so that about 31 milliamperes of current flows through coil 45. The direction of this current is from the cathode of tube 48 through coil 45, to ground. The direction of current flow has therefore been reversed in the coil and the cathode-ray spot (not actually visible at the time) is moved from the top of the screen to the bottom so that it is then in position to begin its vertical sweep upward. The circuit will remain in this condition as long as relay 12 is in the operation position.

When the keying circuit 32 deenergizes the winding of relay 12, the relay opens the connection 52 between the condenser 106 and the contact of potentiometer 104. Immediately upon this opening of the charging circuit, the condenser starts to discharge through the path comprising resistor 101, the resistance of potentiometer 104, and the high resistance circuit through 53 and 107, the voltage drop across 53 and 107 appearing as negative biasing voltage between the grid and cathode of tube 47. The condenser will continue to discharge until its junction with the grid of tube 47 again reaches the potential of the cathode of tube 47, and the length of time required to accomplish this will depend on the adjustment of range rheostat 53, i. e., on the amount of resistance of the rheostat 53 which is in circuit. As the condenser discharges, the negative bias on the grid of tube 47 gradually decreasing, the tube becomes again conducting. As the plate current of the tube 47 increases from zero, a voltage drop again builds up across resistors 108 and 109, causing tube 48 to return gradually to its condition of plate current extinction. The current flow through coil 45 will therefore gradually decrease from 31 milliamperes to zero, and then increase with reversed sign or direction until it reaches its former value of approximately 25 milliamperes. The cathode-ray spot therefore will sweep from the bottom of the screen to the top, and its rate of travel will depend on the time required for the current in the coil 45 to decay to zero and build up to its full value in the opposite direction.

The approximate timing of the upward sweep or travel is accomplished by adjustment of the resistor network comprising resistor 107 and range rheostat 53. Finer adjustment may be obtained by the potentiometer 104, which controls the sweep amplitude and rheostat 108, which controls the sweep rate.

The setting of the potentiometer 104 adjusts the voltage to which the condenser 106 will be charged when relay 12 closes conductor 52; and the setting of this potentiometer also adjusts the grid-cathode bias voltage then applied to tube 47. If the potentiometer contact were set too near the −100-volt terminal of the potentiometer, the condenser would be charged to a voltage too great, and consequently the grid of tube 47 would remain near a plate current cut-off potential for a period after the end of the transmission of the sound pulse, i. e., after the opening of conductor 52, and the upward sweep would begin too late. If the potentiometer contact were set too far from the −100-volt terminal of the potentiometer, the negative biasing voltage applied between the grid and cathode of tube 47 through conductor 52 upon the operation of relay 12 would be so small that the grid of tube 47 would not entirely extinguish the plate current of tube 47, and consequently the plate of tube 48 would not draw sufficient current to cause the cathode-ray spot to move all the way to the bottom of the screen. With proper adjustment of potentiometer 104, the spot will be brought to the bottom of the screen and its vertical sweep upward will start at the instant the relay 12 is released.

The rheostat 108 adjusts the sweep time so that the spot just completes its travel to the top of the screen when the relay 12 operates to start the next sweep. With any given setting of the range rheostat 53, the length of time current will flow through rheostat 108 and resistor 109 will be constant, since, with the keying circuit 32 operating the relay 12 at a given sound pulsing rate, the time between operations of the relay is constant. The value of voltage this current will develop on the grid of tube 48 in this fixed length of time will depend largely on the amount of resistance the rheostat introduces in the circuit. By adjustment of this rheostat this grid bias can be made to reach its ultimate plate current cut-off value just as the relay operates to start the spot downward in the next sweep. Under this condition the cathode-ray spot will have just reached the top of the screen and will be in the proper position to be returned to the bottom of the screen for the start of the next upward sweep.

The input modulator 20 comprises a varistor that includes four copper-oxide rectifier units 121, 122, 123, and 124, which may be alike, each forming an arm of a bridge circuit and all pointed in the same direction around the circuit.

The secondary windings of the input transformers 15 and 16 of the modulator 20 are connected in series across the primary winding of output transformer 125 of the modulator. To one end of that primary winding is connected the junction of arms 121 and 122, and to its other end is connected the junction of arms 123 and 124. A conductor 126 connects the junction of the secondary windings of transformers 15 and 16 to the center of an output coupling coil 127 of the oscillator 25; and that coil is connected between the junction of arms 121 and 124 and the junction of arms 122 and 123, to supply a 225-cycle wave from the oscillator to the modulator 20.

As indicated above, during the receiving condition of the system R is connected to 15 and L is connected to 16; and as explained below, the varistor modulator 20 supplied with 225-cycle voltage from the oscillator 25 short-circuits the secondary winding of 16 during those half-cycles of the 225-cycle voltage in which the upper terminal of coil 127 is positive with respect to its lower terminal, which may be called the positive half-cycles, and short-circuits the secondary winding of 15 during the alternate half-cycles, i. e., the negative half-cycles. The output of the modulator 20 is primarily the voltage from R or L, except for the transition period at the zero voltage point of the oscillator voltage cycle when the oscillator voltage is causing the varistor to transfer the short-circuit from one input transformer to the other. During this transition time or period the modulator output is a combination of the two voltages from R and L, and as shown hereinafter, is of frequency greater or less than 24 kilocycles, the amount and direction of frequency shift depending on the amount and direction of phase difference between these two voltages.

The 225-cycle oscillator voltage that is applied to the varistor 20 has a root mean square value of .4 volt, for example, and since the signal voltage received at the varistor is at most only a few millivolts, for example, the oscillator voltage controls the resistance of the copper-oxide units of the varistor. When the oscillator voltage is applied to the varistor, the resistance of the copper-oxide discs varies from about 4 ohms in the conducting direction to 6,000 ohms in the nonconducting direction with a very large change in resistance taking place during the time in the oscillation voltage cycle when the voltage is passing from positive through zero to negative or vice versa. Therefore, except for a small part of the voltage cycle around the zero voltage point, one-half of the varistor or the other half has a resistance that is low enough to be considered a short circuit.

During the positive half-cycle of the voltage of the 225-cycle oscillator, i e., when the 225-cycle oscillator voltage applied to the varistor is in such direction that the upper terminal of coil 127 is positive with respect to its lower terminal, the copper-oxide discs in arms 123 and 124 short-circuit the transformer 16, the impedance of the two halves of the coil 127 in parallel opposing relation being negligibly low for the 24-kilocycle frequency, and the output of the modulator, delivered to transformer 125, will be the voltage derived from R and 15. On the next half-cycle of the oscillator voltage, i. e., the negative half-cycle, the lower terminal of coil 127 is positive with respect to its upper terminal and the transformer 15 is short-circuited by the copper-oxide units in arms 121 and 122, so the output voltage of the modulator, delivered to transformer 125, will be the voltage derived from L and 16. During the period of time extending from shortly before the end of the positive half-cycle of the oscillator voltage to shortly after the beginning of the negative half-cycle the varistor resistance across the secondary winding of transformer 16 increases rapidly from a short-circuit condition or value and the resistance across the secondary winding of transformer 15 decreases rapidly toward a short-circuit condition. The output voltage of transformer 15 will therefore gradually decrease to a negligible amount while the output voltage of transformer 16 is rising to a maximum, and the modulator output will be a combination of these two voltages. These conditions are illustrated in Fig. 2, which indicates the effect of the 225-cycle oscillator voltage on input and output voltages of the modulator. In Fig. 2 the portion of the oscillator voltage cycle marked 16S corresponds to the time transformer 16 is short-circuited, and the portion 15S corresponds to the time transformer 15 is short-circuited.

As noted above, when the system is adjusted to transmit a 24-kilocycle sound pulse from the projector and the projector bearing is the same as the target bearing, the voltages produced in the two projector halves R and L by the echo signal will be in phase; and with the projector trained off the target, the returning 24-kilocycle signal will produce voltages in R and L that are out of phase in proportion to the angle the projector is trained from the on-target position. In other words, with the projector trained on the target the two output voltages of the projector are in phase and in the off-target condition they are out of phase, the magnitude and sign of their phase difference depending on the extent and direction the projector is trained in azimuth from the bearing of the target. There will therefore be one of three voltage conditions existing in the modulator output. These are illustrated qualitatively by three sets of curves, A, B and C, in Fig. 3, which indicate the phase and frequency of input and output voltages of the modulator, these curves corresponding in time to a transition of the oscillator voltage from its positive half-cycle to its negative half-cycle as shown by curve D.

Curves A illustrate the formation of the modulator output when the projector is trained on the target and the output voltages of transformers 15 and 16 are consequently in phase. At a point of the modulation oscillator voltage cycle where the varistor has short-circuited transformer 16, i. e., at a time preceding that which corresponds to the depicted portion of curves A and D, the modulator output consists of the output delivered from transformer 15. As the oscillator voltage progresses toward zero, a time corresponding to the left-hand edge of the figure is reached when the varistor resistance across transformer 16 begins to rise and the resistance across transformer 15 begins to decrease. Voltage from both transformers begins to appear in the modulator output, (i. e., voltage from 16 begins to appear in the modulator output and is combined with the voltage from 15 appearing in the modulator output). This process continues until, at the zero voltage point of the oscillator voltage cycle, maximum voltage is delivered to the modulator output, as a result of the contributions of both input transformers. As the oscillator voltage passes from zero and takes values of an opposite sign, (the negative sign), the resistance across transformer 15 gradually decreases until a time, subsequent to the time corresponding to the right-hand edge of the figure, arrives when the modulator output is that delivered by the input transformer 16. After the oscillator voltage with the negative sign passes maximum amplitude, it progresses toward zero and the above process reverses, the modulator output again becoming a maximum (as a result of the contributions from both input transformers) when the oscillator voltage becomes zero. As the oscillator voltage proceeds from zero to its maximum positive value, the modulator output again becomes the output from transformer 15.

Since, with the projector trained on the target, the voltages produced in the two projector halves R and L by the 24-kilocycle echo signal are in phase, the resultant voltage produced across their secondary windings or delivered to the modulator output transformer 125 during the time of transition from one-half (positive or negative) of the modulation oscillator cycle to the next half will be in phase with these voltages and be of their frequency, but will be of increased amplitude with maximum increase occurring at the zero voltage point of the oscillator voltage cycle. The output of the modulator during an on-target condition is therefore a voltage of a frequency of 24 kilocycles per second increasing in amplitude momentarily at the rate of 450 times a second (i. e., at the frequency at which the instantaneous value of the 225-cycle oscillator voltage passes through its zero value), or in other words with amplitude modulation at a frequency of 450 cycles per second.

Curves B of Fig. 3 illustrate the formation of the modulator output for an oscillator voltage transition period which is the same as in the case of curves A; but in the case of curves B the projector bearing has been so shifted, i. e., the projector has been trained off-target in such direction and to such extent, that the voltage output of transformer 16 is ninety degrees behind that of transformer 15. Thus, curves B illustrate the formation of the modulator output during a period in which its constitution changes from one voltage, viz., the voltage delivered by transformer 15 (with the varistor short-circuiting transformer 16), to a voltage lagging behind said one voltage by 90 degrees, viz., the voltage delivered by transformer 16 (with the varistor short-circuiting transformer 15). As the modulator output voltage transition from the output of transformer 15 to the output of transformer 16 progresses, the consequent progressive shift in the phase of the modulator output voltage, from a phase which is that of the output voltage of transformer 15 to a phase which is that of the output voltage of transformer 16, is tantamount, during the first half of the transition period, to a progressive increase in the wavelength, or a progressive decrease in the frequency, of the modulator output (from its wavelength and frequency when they are those of the 24-kilocycle output of transformer 15), and is tantamount, during the second half of the transition period, to a progressive decrease in the wavelength, or increase in the frequency, of the modulator output, (to its wavelength and frequency when they are those of the 24-kilocycle output of transformer 16). Thus the modulator output during its transition period corresponding to the transition from the positive half-cycle of the oscillator voltage to the negative half-cycle, decreases in frequency from 24 kilocycles until it reaches a minimum value at the zero voltage point of the oscillator voltage cycle, and then gradually returns to 24 kilocycles. Analogously, (for projector bearing deviation of the same sign) the modulator output, during its transition period corresponding to the transition from the negative half-cycle of the oscillator voltage to the positive half-cycle, increases in frequency from 24 kilocycles until it reaches a maximum value at the zero voltage point of the oscillator voltage cycle, and then gradually returns to 24 kilocycles; because during this transition period the phase of the modulator output voltage progressively shifts from a phase which is that of the output voltage transformer 16 to a phase which is that of the output voltage of transformer 15, 90 degrees ahead. (This may readily be seen from curves C, described below, by considering the solid line curve C to be a dash line curve representing the output voltage of transformer 16 and considering the dash line curve C to be a solid line curve representing the output voltage of transformer 15.) Therefore, the modulator output during the assumed off-target condition is a 24-kilocycle voltage alternately decreasing and increasing momentarily below and above 24 kilocycles, or in other words, is a 24-kilocycle voltage decreasing momentarily to a lower frequency, then returning to 24 kilocycles, next increasing for a moment to a higher frequency, then returning to 24 kilocycles, and repeating the whole process at the 225-cycle rate of the oscillator voltage cycle as long as the echo signal from the target is being received and the projector bearing retains its assumed value; and the amount the modulator output frequency deviates above and below the average value of 24 kilocycles depends upon the magnitude of the phase difference between the two projector voltages and consequently upon the magnitude of the angle constituting the projector bearing deviation, i. e., the angle through which the projector is trained off-target.

Moreover, this same character of modulator output will be retained if the sign of the projector bearing be reversed (i. e., if the projector be trained through its on-target bearing to the opposite off-target direction), except that, due to changed phase relation of the two projector voltages, at any given transition point of the oscillator voltage cycle the sign of the deviation of the modulator output frequency from 24 kilocycles will be the reverse of the sign that obtained before the change of the projector bearing. This is readily seen from curves C of Fig. 3, which are for the case of this changed bearing, the magnitude of the projector bearing deviation being considered to be 90 degrees, i. e., the same as before the change in the sign of the deviation.

These curves C illustrate for this changed projector bearing, the formation of the modulator output for an oscillator voltage transition period corresponding to that for curves A and B, i. e., a transition of the oscillator voltage from its positive half-cycle to its negative half-cycle, as shown in curve D. Thus, the curves C illustrate the formation of the modulator output voltage during a period of transition of this voltage in which its constitution changes from one voltage, viz., the voltage delivered by transformer 15 (with the varistor short-circuiting transformer 16), to a voltage leading said one voltage by 90 degrees, viz., the voltage delivered by transformer 16 (with the varistor short-circuiting transformer 15). As the transition is from the lagging voltage to the leading voltage, in the transition period the modulator output frequency increases from 24 kilocycles until it becomes a maximum at the zero voltage point of the oscillator voltage cycle, and then gradually returns to 24 kilocycles.

The modulator output transformer 125 transmits the output of the modulator 20 to the input of the receiver 26.

In the on-target condition, with the output of this modulator a single 24-kilocycle frequency, in the receiver this 24 kilocycle wave is amplified by amplifier 55 and changed to a wave of intermediate frequency of 150 kilocycles by modulator 56 fed from the 174-kolocycle oscillator 23, and this 150-kilocycle wave is changed, by modulator 58 fed from the 150.8-kilocycle oscillator 60, to an .8-kilocycle wave which is transmitted through the band-pass filter 61 and the audio amplifier 62 for delivery to the loud-speaker 63 and the audio amplifier 27 in parallel.

When a 24-kilocycle echo signal is being received by R and L with the projector off-target, the output of the modulator 20 is, as explained above, a 24-kilocycle voltage with plus and minus deviations from this frequency for short periods during the transition times of the voltage cycle of the oscillator 25. Under this condition, but for the effect of the inductances and capacities of the receiver 26 the receiver output would be similar to the modulator output, i. e., would be an 800-cycle voltage with plus and minus deviations from the 800-cycle value during the transition times of the voltage cycle of the oscillator 25. However, due to the inductances and capacities in the receiver circuit 26, the receiver circuit characteristics retard changes in frequency, so the receiver output changes smoothly in frequency, or in other words is a frequency-modulated wave having a modulation rate equal to the frequency of the 225-cycle oscillator 25, and a frequency deviation from the 800-cycle means that depends on the amount of frequency shift that occurs in the circuit of the modulator 20, which in turn depends on the phase difference between the voltages delivered by R and L. When the projector is trained on the target, the signal voltages from R and L are in phase, and as indicated above, the output of the modulator 20 is a single 24-kilocycle frequency. Then, frequency modulation does not appear in the output of the receiver 26, which is a single frequency 800-cycle wave under such condition.

A description will now be given, first briefly, then with further details, of the manner in which the circuit including the frequency discriminator 29 and amplifiers 68 and 69, the demodulator 30, the amplifiers 36 and 37, the conjugate input rectifier 40 and the direct current amplifier 41, utilizes the frequency-modulated output of the receiver 26 to produce horizontal deflections of the cathode-ray beam in the oscilloscope 42.

The output signal from the receiver 26 is applied to the discriminator 29, wherein the phase modulation present in the receiver output causes the signal to become amplitude-modulated also.

Since the frequency modulation rate is 225 cycles per second the amplitude modulation produced will have a 225-cycle envelope. The discriminator output is amplified by the audio amplifier 27 and then applied to the full-wave amplitude demodulator or detector 30, which detects the 225-cycle amplitude modulation, thereby producing an output wave component having a frequency of 225 cycles per second. The circuit 31 includes a high pass filter and a tuned circuit resonant at 225 cycles. This circuit 31 passes only the 225-cycle component of the demodulator output. After amplification in amplifier 36 this 225-cycle voltage is applied through conductor 36' to the conjugate input rectifier 40. In 40 it is combined with a 225-cycle wave received from oscillator 25 through the conductors 38, a phase shifting network 130, the amplifier 37 and the conductors 37'. The wave combination produces a direct current voltage which is amplified by the direct current amplifier 41 to deflect the cathode-ray beam of the oscilloscope 42 horizontally.

When the projector is trained from one position to another by passing through the bearing of a received echo signal, the sign or direction of phase shift between the two projector voltages produced by the signal changes 180 degrees. That is, the leading voltage becomes the lagging voltage. Since the amplitude modulation depends on the phase shift present between the voltages from R and L, the amplitude modulation will also change direction, or in other words, the phase of the 225-cycle output of the demodulator 30 will reverse, with respect to the 225-cycle reference wave supplied to the conjugate rectifier 40 from the oscillator 25 through elements 38, 130, 37 and 37'.

As pointed out below, there exists a 90-degree phase difference between the 225-cycle voltage of the oscillator 25 and the 225-cycle signal output of the demodulator 30. In order that these voltages may be compared in the rectifier 40 to yield the desired results, these voltages should be brought into phase. This is accomplished by transmitting the voltage of the oscillator 25 to the rectifier 40 through the phase-shifting network 130 comprising condenser 131 and resistor 132, and slightly adjusting the frequency of the output circuit of oscillator 25, for example, by its tuning condenser 135, to make certain tuned circuits referred to hereinafter work on either the capacitive or inductive side of resonance.

The 225-cycle signal voltage from conductors 36' and the 225-cycle oscillator voltage from conductors 37' are simultaneously applied to the rectifier 40. When the projector orientation is in one direction off the target bearing the signal input voltage applied to the rectifier 40 will be in phase with the oscillator voltage applied to the rectifier, and when the projector orientation is in the other direction off the target bearing the signal and oscillator voltages applied to the rectifier 40 will be 180 degrees out of phase. The arrangement of the rectifier circuits is such that the voltages add for one projector position and subtract for the other.

The output of the conjugate-input rectifier 40 is applied to the push-pull direct current amplifier 41 in such a manner that, when the voltages add, the plate current in one amplifier tube increases and that in the other tube decreases, and when the voltages subtract, the direction of current change in the amplifier tubes is reversed.

The plate current of the direct current amplifier tubes is obtained from the 240-volt terminal of source B through the horizontal deflecting coils 43 and 44 of the oscilloscope 42. When the projector is trained to the right of its on-target bearing, a received signal causes the magnetic field produced by the change in amplifier plate current through the horizontal deflecting coils to be in such direction as to cause the cathode-ray spot to deflect to the left momentarily during its vertical travel. When the projector is trained to the left of its on-target bearing the direction of the magnetic field is reversed and the spot will be deflected to the right. The direction of the deflection of the spot upon reception of a signal is therefore an accurate indication as to the direction the projector must be trained in order to obtain on-target bearing.

Considering the operation of the discriminator 29 and the demodulator 30 in more detail, the 800-cycle frequency-modulated output of the receiver 26 is applied to the gain control potentiometer 28 in the input circuit of audio amplifier 27, by which the input level can be adjusted to such a value that deflections on the cathode-ray tube due to noise are low enough in amplitude to be not objectionable. Signal voltage from the potentiometer is applied to the tube 68 through the discriminator consisting of the series condenser 65 and shunt resistor 66. As the 800-cycle frequency-modulated signal impressed across this discriminator varies in frequency, the magnitude of the voltage drop across the condenser 65 also varies, because the condenser presents more reactance to low frequencies than to high frequencies. This in turn causes the amplitude of the voltage drop across resistor 66 to vary. Since the frequency modulation rate is 225 cycles per second, the amplitude of the voltage drop across the resistor 66 will change at a 225-cycle rate and the magnitude of the amplitude variation will depend on the range of frequency shift present in the 800-cycle frequency-modulated signal. There is, therefore, applied to the amplifier tube 68 the 800-cycle signal frequency-modulated at 225 cycles per second and amplitude modulated at 225 cycles per second. This 800-cycle frequency-modulated and amplitude-modulated signal is amplified in tubes 68 and 69 and then applied by transformer 136 to the full wave demodulator 30. The cathodes of the demodulator are biased positively with respect to the anodes by the voltage drop across a resistor 137 which, with a resistor 138, forms a voltage divider connected across the ground terminal and the 220-volt terminal of the source B. This bias voltage is of such magnitude as to prevent the normal voltages due to noise from passing to the output but permit any signal voltage capable of producing an indication in the oscilloscope to pass to the ouput of the demodulator. A condenser 139 for by-passing alternating current is connected across the bias resistor 137. The demodulator rectifies the signal and thereby develops a signal output voltage across its cathode resistor 140. This voltage is applied through a coupling condenser 141 to a transformer 142 which is resonated at 225 cycles by condensers 143 and 144. The condensers 141 and 143 form a low impedance path for frequencies above 225 cycles per second, while the condenser 141 and the primary winding of the transformer 142 form a low impedance path for frequencies below 225 cycles per second. Therefore the 800-cycle frequency modulated output and other unwanted frequencies present in the demodulator are filtered out and the 225 cycle component (which is detected amplitude modulation) are transmitted to the amplifier 36 due to the high impedance of the resonant circuit formed by elements 142, 143 and 144 at this frequency, and so are amplified in 36 and then transmitted through the conductors 36' to input transformer 150 of the conjugate-input rectifier 40. During an on-target condition the condenser 141 aids in reducing erratic deflections on the cathode-ray tube caused by transients, as it attenuates the signal and blocks the direct current component from reaching the parallel-resonant circuit of transformer 142.

Above, it was shown that maximum frequency modulation (i. e., maximum frequency deviation) occurred at the instant the 225-cycle voltage of the oscillator 25 was passing through the zero voltage point of its cycle. The maximum amplitude of the 225-cycle signal output of the demodulator 30 occurs at this same instant, since this maximum amplitude occurs at the instant of maximum frequency modulation. Therefore, there will be a difference in phase between these two 225-cycle voltages of 90 degrees.

As will appear from description, hereinafter, of operation of the conjugate-input rectifier 40, it is desired to have the 225-cycle voltage that is applied to the conjugate rectifier either in phase or 180 degrees out of phase with the voltage from oscillator 25 that is also applied to this rectifier. This condition can be attained by introducing appropriate phase shift. For example, this phase shift may be made to occur principally at the phase shifting network 130 comprising the series condenser 131 and the shunt grid resistor 132 and at the transformer 142. Due to the small capacitance of the condenser 131, the voltage applied to the amplifier 37 will be shifted in phase from the voltage of the oscillator 25, and, taking into consideration phase shifts ocurring at various points in the signal circuits, the phase shift of the network 130, which may approximate 90 degrees, very nearly brings the signal and oscillator voltages into phase. The final adjustment may be obtained in the resonant circuit of the transformer 142 by slightly changing the frequency of the oscillator 25, for example by adjustment of its tuning condenser 135. Changing the frequency of this oscillator likewise changes the frequency modulation rate, and the amplitude modulation derived from the discriminator will likewise be at the new frequency of the oscillator 25. By shifting this frequency in the proper direction from the 225-cycle resonant frequency of the circuit comprised by the transformer 142 and its associated elements, the output of this transformer can be made more or less out of phase with its input. With a slight adjustment of oscillator frequency it is therefore possible to make the voltage from the oscillator 25 and the signal voltage either in phase or 180 degrees out of phase at the conjugate-input rectifier, the relationship depending on the direction the projector is turned from its on-target bearing.

The above detailed operation of the circuit including the discriminator 29 and the demodulator 30, is for an off-target condition, i. e., a condition in which the output of receiver 26 supplies an 800-cycle frequency-modulated wave to the discriminator. Before detailing the operation of the rectifier 40 and direct current amplifier 41 for the off-target condition, the operation of the discriminator 29 and the demodulator 31 for the on-target condition will now be detailed. The receiver output for this condition is an 800-cycle wave containing no frequency modulation. Since there is no variation of frequency of the 800-cycle wave applied to the discriminator, the voltage drop across the resistor 66 will have no variation due to frequency change, and the output of the tube 68 likewise will be an 800-cycle signal free from 225-cycle modulation. This signal is amplified by the tube 69, rectified by the demodulator 30, and finally filtered out in the output circuit of the demodulator and the resonant circuit of the transformer 142. Since there is no 225-cycle modulation on this signal, there will be no output from the transformer 142. The input to the rectifier 40 will be only the voltage from the oscillator 25. In other words, the conjugate input rectifier 40, and so the direct current amplifier 41, is not affected by the signal. Consequently, the oscilloscope spot is not deflected from its vertical travel. That is, when a signal is received the spot continues to travel vertically without significant deflection, showing only a brightening effect due to the application of some of the signal voltage as a brightening voltage.

Considering, now, detailed operation of the circuit of the conjugate input rectifier 40 and the direct current amplifier 41, this circuit comprises a rectifier tube 151 feeding direct current amplifier tubes 152 and 153 through a network 160 of resistors and condensers including resistors 161, 162, 163, 164, 165 and 166 and condensers 167 and 168. The 221-cycle signal from the buffer amplifier 36 is applied to the plates of the rectifier tube 151 through the conductors 36' and the input transformer 150. A 225-cycle switching voltage from the oscillator 25 is also applied to these plates by conductors 37', through the center tap of the secondary winding of the transformer 150 and the junction of resistors 161 and 162. The rectified resultant of the combined voltages is applied through the network 160 to the grids of the tubes 152 and 153. These grids are maintained at a negative bias with respect to the grounded cathodes of these tubes by a voltage divider comprising resistors 175 and 176 connected to the −100 volt terminal of source B. This bias is sufficient to limit the plate current of these tubes to a low value. When a voltage from the network 160 is applied to these grids the bias increases on one and decreases on the other. The plate current therefore increases in one of the deflecting coils 43 and 44 and decreases in the other, thus causing the oscilloscope spot to be deflected horizontally due to the resulting change in the magnetic field. The detailed operation of the circuit may be considered under three operating conditions as follows:

(1) The on-target condition when no 225-cycle signal voltage is produced or applied to the rectifier and only the voltage from the oscillator 25 is applied to the rectifier;

(2) The off-target condition when the signal voltage and the oscillator voltage are applied to the rectifier in phase; and (3) The off-target condition when the signal voltage and the oscillator voltage applied to the rectifier and 180 degrees out of phase.

In condition (1) a 225-cycle voltage from the conductors 37' is applied to the plates 177 and 178 of the tube 151 through the center of the secondary winding of the transformer 150 and the two halves 171 and 172 of that winding. The voltages on these plates therefore are in phase and are equal at all times. During one-half of the alternating current cycle, current will flow from resistor 173 through coil 171, plate 177, cathode 187, and resistor 161. Current will also flow from resistor 173 through coil 172, plate 178, cathode 188 and resistor 162. These currents are equal and produce equal voltages across the resistors 161 and 162. These voltages across resistors 161 and 162 charge condensers 167 and 168. These resistors give the circuit a long time constant, so these condensers will only discharge a small amount during the succeeding half cycle when current does not flow through tube 151. A direct current voltage is thus maintained across each of the condensers 167 and 168. Since the currents flowing through the resistors 161 and 162 are in opposite directions, the voltages developed oppose each other, and as they are equal in magnitude, zero voltage exists between the cathodes 187 and 188. The voltage drop across resistors 165 and 166 is therefore zero and the grid-cathode voltage of tubes 152 and 153 will be unaffected and remain at its original high negative grid-bias value.

Considering condition (2), the poling of the primary winding of the transformer 150 will be assumed to be such that for the half-cycle of the voltage from oscillator 25 in which the rectifier 151 conducts, the voltage induced in the secondary winding will be in a direction to make its terminal connected to plate 177 positive with respect to its terminal connected to plate 178. During this half-cycle of the oscillator voltage the oscillator and signal voltages are in the same direction in coil 171 but are in opposite directions in coil 172. Therefore, the voltage drop across resistor 161 exceeds that across 162, which is of opposite sign. Consequently, current will flow from condenser 167 through resistors 163, 165, 166 and 164 to condenser 168. Thus, resistors 165 and 166 being equal, the potential of the grid of tube 152 with respect to its grounded cathode is driven in a positive direction and the potential of the grid of tube 153 with respect to its grounded cathode is driven an equal amount in the negative direction. Therefore the plate current of tube 152 increases and that of tube 153 decreases. Since the currents through the like coils 43 and 44 are no longer equal, their magnetic fields no longer cancel, and the spot deflects horizontally.

Operation under condition (3) is the same as under condition (2) except that, for the half-cycle of the voltage from oscillator 25 in which the rectifier tube 151 conducts, the oscillator and signal voltages are in phase in coil 172 and in phase opposition in coil 171 and consequently the polarity throughout rectifier and amplifier system is the reverse of that for condition (2). Thus the grid of tube 152 is driven in a negative instead of a positive direction, and the grid of tube 153 is driven in a positive instead of a negative direction. Consequently the horizontal deflection of the oscilloscope spot is opposite to that which obtained for condition (2).

Thus, by noting the deflection of the spot, the direction of deviation of the bearing of the projector from the direction of the received sound or from the bearing of the target is apparent.

While the above description has assumed that during the on-target condition the spot will have no horizontal motion, due to certain transient conditions ordinarily a received signal may then cause a slight erratic spot deflection, which however is of no practical significance. A slight projector bearing deviation from the on-target bearing, as for example a deviation of one degree, will produce a noticeable horizontal deflection in one direction only.

The distance from the bottom of the vertical sweep of the oscilloscope spot to the point in the upward vertical sweep at which the horizontal deflection occurs is proportional to, or a measure of, the time that the sound pulse causing the horizontal deflection has taken to travel from the projector to the target and back, or in other words is a measure of the range of the target or the distance to the target. A scale (not shown) may be provided, along the vertical sweep path of the oscilloscope spot, calibrated in yards, for example, so that the position of the horizontal deflection along the vertical scale indicates approximately, for any given adjustment of the range potentiometer, the range of the target.

As indicated above, in echo ranging the telephone receiver or loud-speaker 63 is useful for observing the strength of received echoes and therefore the approach to or recession from the on-target condition, i. e., the projector bearing for which the echo is a maximum.

The receiver 63 is useful also for sound listening to determine the bearing of any source of noise such as propeller or machinery noise from an enemy ship, torpedo noise, etc., the bearing or direction of approach of such noise being determined as that projector bearing in which the sound received in the device 63 is loudest. For this sound listening, underwater sounds may be observed throughout the frequency range 10 kilocycles to 30 kilocycles, for example. This may be done by changing the tuning of the oscillator 23 and the amplifier 55 simultaneously, for instance, by the ganged condensers C23 and C55 shown adjacent the devices 23 and 55, as representing tuning condensers for those devices, respectively. For example, these condensers may maintain the tuning of oscillator 23 always 150 kilocycles higher than the tuning of amplifier 55, throughout a tuning range of 10 kilocycles to 30 kilocycles for the amplifier 55 and a tuning range of 160 kilocycles to 180 kilocycles for the oscillator 23, The receiver 63 is useful also as a receiver in telegraphic communication. This can be obtained between ships, equipped with the bearing deviation indicator, by causing the keying circuit 32 to key the operating circuit of the relay in accordance with the desired telegraphic code. The system receives continuous wave or modulated continuous wave telegraph signals.

The broad frequency band of transmission of the projector makes possible a choice of the sound frequency, in transmission and reception, that is not only useful in connection with simultaneous operation of the bearing deviation indication equipment provided on several ships in the same area, but also gives a considerable control over the directivity of the projector, since the projector is more directive at the high frequencies of its transmission range than at the low frequencies. The wide frequency range is also of particular value in listening to sounds such as propeller and machinery sounds. Moreover, the ability to select the sound frequency to be used in transmitting and receiving telegraph signals makes available additional telegraph channels.

Fig. 4 shows a modification of the bearing deviation indicating system of Fig. 1 which uses no frequency modulation and includes no frequency discriminator circuit such as the circuit 29 of Fig. 1. A projector 3, divided into two parts R and L serving as the receiving pick-up devices or hydrophones, may be, for example, of the crystal type referred to in connection with Fig. 1, the bearing deviation indication being obtained from the phase difference of the voltage outputs of R and L, as in the case of the system of Fig. 1. A deflection or visual indication having the sign or sense of this phase difference, and having a magnitude proportional to this phase difference, may be obtained in a zero-center indicating device 242, as for example, a cathode-ray oscilloscope or a direct current milliammeter. If an oscilloscope is used, it may be, for example, of the type shown in Fig. 1, the horizontal deflection of the cathode-ray spot indicating the projector bearing deviation as in the case of Fig. 1, and the vertical sweep circuit being, for instance, as shown in Fig. 1.

For operating the indicator 242 in response to the signals from R and L, a circuit comprising a system of modulators is used. The circuit includes a pair of transformers 215 and 216 fed from R and L and feeding a pair of modulators 201 and 202 each of the duplex or balanced type, an amplifier or receiver circuit 226 fed by the modulators 201 and 202, a demodulator 230, and a conjugate-input rectifier or phase-sensitive, amplitude-sensitive detector 240. An oscillator or alternating current source 225 supplies modulators 201 and 202 with voltages $e_3$ and $-e_3$, respectively, which may have a frequency of 225 cycles per second for example. The source 225 also supplies the voltage $e_3$ to the rectifier 240. The receiver 226 is fed not only by the modulators 201 and 202, but also by a phase shifter 295, which is supplied with voltages from R and L through tertiary windings on the transformers 215 and 216 and which introduces a 90-degree phase shift in those voltages in transmitting them to the receiver 226. If desired, the connections (shown dotted) between projector 3 and transformers 215 and 216 may be the same as the connections shown in Fig. 1, between the projector 3 and the transformers 15 and 16, and the means for transmitting the sound pulses or signals may be as described in connection with Fig. 1.

The signal voltage outputs from R and L are designated $e_R$ and $e_L$, respectively. They need not be restricted in any manner except that they must be of the same frequency. However, to simplify the mathematical derivation below, it is there assumed that they are equal in magnitude but may differ in phase by an angle $\theta$. The equations for these output voltages, designating their frequency as $p/2\pi$ and their maximum instantaneous magnitudes as E, are:

$$e_R = E \sin pt \quad (1)$$

$$E_L = E \sin (pt + \theta) \quad (2)$$

These signals $e_R$ and $e_L$ are introduced into the balanced modulators 201 and 202, respectively, into which, respectively, are introduced the voltages $e_3$ and $-e_3$, of frequency $q/2\pi$, the equation for $e_3$ being $$e_3 = E_3 \sin qt$$

Assuming $E_R$ and $E_L$ to be equal in magnitude, the outputs from these modulators will be:

$$e_4 = e_R e_3 = E_4[\cos (p-q)t - \cos (p+q)t] \quad (3)$$
$$e_5 = -e_L e_3 = -E_4[\cos [(p-q)t+\theta] - \cos [(p+q)t+\theta]] \quad (4)$$

These outputs can be combined either additively or subtractively, by transformers 296 and 297, for example, to give in the input of the receiver 226:

$$e_4 + e_5 = 2E_4 \sin \frac{\theta}{2}$$
$$\left[ \sin \left[ (p-q)t + \frac{\theta}{2} \right] - \sin \left[ (p+q)t + \frac{\theta}{2} \right] \right] \quad (5)$$

$$e_4 - e_5 = 2E_4 \cos \frac{\theta}{2}$$
$$\left[ \sin \left[ (p-q)t + \frac{\theta}{2} + \frac{\pi}{2} \right] - \sin \left[ (p+q)t + \frac{\theta}{2} + \frac{\pi}{2} \right] \right] \quad (6)$$

Likewise, the original signals can be combined either additively or subtractively, by the tertiary windings of transformers 215 and 216, for application to the input of the receiver 226. If they are not shifted in phase, (i. e., if the phase shifter 295 be omitted), the results will be:

$$e_R + e_L = 2E \cos \frac{\theta}{2} \sin \left( pt + \frac{\theta}{2} \right) \quad (7)$$

$$e_R - e_L = 2E \sin \frac{\theta}{2} \sin \left( pt + \frac{\theta}{2} - \frac{\pi}{2} \right) \quad (8)$$

However, with the 90-degree phase shift introduced by the phase shifter 295, the results are:

$$e'_R + e'_L = 2E \cos \frac{\theta}{2} \sin \left( pt + \frac{\theta}{2} + \frac{\pi}{2} \right) \quad (9)$$

$$e'_R - e'_L = 2E \sin \frac{\theta}{2} \sin \left( pt + \frac{\theta}{2} \right) \quad (10)$$

In the input of the receiver the outputs of the modulators are combined with the original signals to give $e_6$. This voltage is amplified and demodulated in the receiver 226 and the demodulator 230 to give its envelope, which will contain a voltage of frequency $$\frac{q}{2\pi}$$

that appears as $e_7$ in the output of the detector 230.

The value of $e_6$ depends upon thte particular manner in which its components are combined. The following tabulation shows the possible combinations making up $e_6$ and the resulting value of $e_7$.

| Receiver Input (i. e., $e_6$) | Demodulator Output (i. e., $e_7$) | |
|---|---|---|
| $(e_R+e_L)+(e_4+e_5)$ | 0 | (11) |
| $(e_R+e_L)+(e_4-e_5)$ | $A \cos^2 \frac{\theta}{2} \sin qt$ | (12) |
| $(e_R-e_L)+(e_4+e_5)$ | $A \sin^2 \frac{\theta}{2} \sin qt$ | (13) |
| $(e_R-e_L)+(e_4-e_5)$ | 0 | (14) |
| $(e'_R+e'_L)+(e_4+e_5)$ | $B \sin \theta \sin qt$ | (15) |
| $(e'_R+e'_L)+(e_4-e_5)$ | 0 | (16) |
| $(e'_R-e'_L)+(e_4+e_5)$ | 0 | (17) |
| $(e'_R-e'_L)+(e_4-e_5)$ | $B \sin \theta \sin qt$ | (18) |

The most useful combinations for the purposes of bearing deviation indication are given in the expressions (15) and (18). In these two expressions the amplitude of the voltage $e_7$ is proportional to the sine of the phase difference between the original signals $e_R$ and $e_L$. Therefore, either of the two corresponding values of $e_6$ can be used to give a right-or-left indication in the device 242, by introducing the corresponding voltage $e_7$ into a conjugate-input rectifier or phase-sensitive detector 240 to which the voltage $e_3$ is also supplied as indicated above.

Fig. 5 shows a circuit similar to that of Fig. 4 but having modulators 301 and 302 with phase-shifting resistors $R_1$, $R_2$, $R'_1$ and $R'_2$ and condensers $C_1$, $C_2$, $C'_1$, and $C'_2$ instead of the modulators 201 and 202 and the phase shifter 295. Without these elements, each of the modulators 301 and 302 is a modulator of usual ring or double-balanced type. The modulator 301 has input transformers 315 and T and output transformer $T_1$. The modulator 302 has input transformers 316 and T' and output transformer $T'_1$. The voltage $e_R$, obtained as in the case of the systems of Figs. 1 and 4, is applied to the primary winding of the input transformer 315 for the modulator 301, and transmitted, through coils 15A and 15B forming the two halves of the secondary winding, to the bridge-network of copper-oxide varistors or rectifiers 1A, 1B, 1C and 1D shunted by the elements $R_1$, $C_1$, $R_2$ and $C_2$, respectively.

The voltage $e_L$, obtained as in the case of the systems of Figs. 1 and 4, is applied to the primary winding of the input transformer 316 for the modulator 302, and transmitted, through coils 16A and 16B forming the two halves of the secondary winding, to the bridge-network of copper-oxide varistors or rectifiers 2A, 2B, 2C and 2D shunted by the elements $C'_1$, $R'_1$, $C'_2$, $R'_2$, respectively.

The oscillator or source 225 feeds to the primary windings of the transformers T and T' waves which induce in their secondary windings the voltages $e_3$ and $-e_3$, respectively. The source 225 also supplies the voltage $e_3$ to the rectifier 240.

The output voltages $e'_4$ and $e'_5$ of the modulators 301 and 302 combine to produce in the input of the receiver 226 the voltage $e_6$ having either of the values indicated in the expressions (15) and (18); and the system of Fig. 5 operates in the same manner as the system of Fig. 4 to produce from this voltage $e_6$ applied to the receiver 226 and the voltage $e_3$ applied to the conjugate-input rectifier, the desired indication in the indicating device 242.

The modulators 301 and 302, with their associated phase shifting elements $R_1$, $C_1$, $R_2$, $C_2$, $R'_1$, $C'_1$, $R'_2$, and $C'_2$, operate to transmit the original signals $e_R$ and $e_L$ with a 90-degree phase shift and combine them with the modulation products that would appear in the output circuits of the modulators in the absence of the phase-shifting elements.

The modulators 301 and 302 in the absence of the phase shifting elements $R_1$, $C_1$, $R_2$, $C_2$, $R'_1$, $C'_1$, $R'_2$, and $C'_2$ will not transmit the original signals $e_R$ and $e_L$ to the amplifier 226. These phase shifting elements operate to unbalance this bridge action and transmit the signals $e_R$ and $e_L$ to amplifier 226 in proportion to the degree of unbalance. If the phase shifting elements are chosen so that the in-phase components of the transmitted waves $e'_4$ and $e'_5$ are equal in magnitude and opposite in sign, which can be done by methods well known in the art, the result will be to transmit a wave which is effectively shifted 90 degrees in phase relative to the sum of the two voltages $e_R$ and $e_L$.

The modulator 20 of Fig. 1 may be viewed as formed of two modulators, one comprising varistors 121 and 122 excited in parallel from the transformer 15 and in series from the winding 127, and the other comprising varistors 123 and 124 excited in parallel from the transformer 16 and in series from the coil 127. As shown, the primary winding of the output transformer 125 is common to these two modulators. However, if desired, the mid-point of this winding may be connected to the mid-point of winding 127 by a conductor (not shown), without materially affecting the operation of the modulator circuit since these two points are equipotential points. The output of the one modulator may be viewed as the voltage between the junction of varistors 121 and 122 and the junction of the secondary windings of transformers 15 and 16, and may be designated $e''_4$; and the output of the other modulator may be viewed as the voltage between the junction of varistors 123 and 124 and the junction of the secondary windings of transformers 15 and 16, and may be designated $e''_5$. The voltage across the secondary winding of transformer 125 may be their sum, $e''_4 + e''_5$, and may be designated $e''_6$. For simplicity, the receiver 26 and potentiometer 28 may be omitted, the amplifier 27 (and frequency discriminator 29) then being resigned to operate at the 24-kilocycle frequency level instead of at the 800-cycle frequency level.

Then $$e''_4 = k_1 e_R + k_2 e_R e_3 \qquad (19)$$

$$e''_5 = k_1 e_L - k_2 e_L e_3 \qquad (20)$$

$$e''_6 = e''_4 + e''_5 = k_1(e_R + e_L) + k_2 e_3(e_R - e_L) \qquad (21)$$

This value of $e''_6$ is the same as the value of $e_6$ given in expression (11).

Thus, $$e''_6 = k_1 E \cos\frac{\theta}{2} \sin\left(pt + \frac{\theta}{2}\right) +$$
$$k_2 E E_3 \sin\frac{\theta}{2}\left[\sin\left[(p-q)t + \frac{\theta}{2}\right] - \sin\left[(p+q)t + \frac{\theta}{2}\right]\right] \qquad (22)$$

This voltage $e''_6$ is differentiated by the frequency discriminator 29. Designating the capacity of the condenser 65 as C, its reactance as $X_C$, the resistance of the resistor 66 as R, the current flowing through the condenser and the resistance (due to $e''_6$) as $i''_6$, the resulting voltage across the resistance as $e'''_6$, and the consequent 225-cycle output voltage of the detector 30 (that is, the envelope of $e'''_6$) as $e'_7$, then if $X_C \gg R$, it follows that:

$$i''_6 = \frac{de''}{dt}$$

$$e'''_6 = R i''_6$$

$$= K_1 E \cos\frac{\theta}{2} p \cos\left(pt + \frac{\theta}{2}\right) +$$
$$K_2 E E_3 \sin\frac{\theta}{2}(p-q) \cos\left[(p-q)t + \frac{\theta}{2}\right] -$$
$$K_2 E E_3 \sin\frac{\theta}{2}(p+q) \cos\left[(p+q)t + \frac{\theta}{2}\right] \qquad (23)$$

and the voltage $e'_7$ of frequency $$\frac{q}{2\pi}$$

is $$e'_7 = K' E^2 E_3 \sin\theta \, pq \cos qt$$
$$= K \sin\theta \cos qt \qquad (24)$$

which is of the correct form to introduce in the rectifier 40, together with the conjugately introduced input voltage $e_3 \angle 90°$, to obtain a direct current output which will vary with $\theta$.

What is claimed is:

1. A system for indicating the sign of the phase angle between a first voltage and a second voltage comprising four two-terminal rectifying devices connected in series, forming a closed circuit and being poled in the same direction in the closed circuit, a coil for applying a third voltage of lower frequency between the junction point of one pair of said rectifying devices and the junction point of the other pair of said rectifying devices, means for applying said first voltage between the mid-point of said coil and a junction between said pairs, means for applying said second voltage between said mid-point and the other junction between said pairs, a circuit comprising frequency demodulating means connected across said two latter junctions to produce a demodulator output voltage having said lower frequency, a phase-sensitive detector network having two input branches, and means for applying to one of said branches said demodulator output voltage and to said other branch a voltage which is approximately in quadrature with said third voltage and which is in phase with said voltage applied to said one branch when said phase angle between said first and second voltages has one sign and in phase opposition to said voltage applied to said one branch when said phase angle between said first and second voltages has the opposite sign.

2. A wave receiving system comprising a pair of like adjacent hydrophone receivers for receiving an underwater sound wave of given frequency, having substantially the same amplitude but a different phase at the two receivers, means connected to said receivers comprising four rectifiers connected in series, forming a closed ring modulator and being poled in the same direction in the ring circuit, a coil for applying a third voltage of lower frequency between the junction point of one pair of said rectifiers and the junction point of the other pair of rectifiers, means for applying said first voltage between the mid-point of said coil and a junction between said pairs, means for applying said second voltage between said mid-point and the other junction between said pairs, an amplifier and receiver connected in the output of said modulator, an amplitude indicator and frequency modulation discriminator respectively connected across said receiver, said discriminator producing an amplitude modulated output voltage having said lower frequency, an amplitude demodulator, a phase-sensitive detector network having two input branches, and means for applying to one of said branches said demodulator output voltage and to said other branch a voltage which is approximately in quadrature with said third voltage and which is in phase with said voltage applied to said one branch when said phase angle between said first and second voltages has one sign and in phase opposition to said voltage applied to said one branch when said phase angle between said first and second voltages has the opposite sign, and a zero center indicator for indicating said phase difference.

JOHN G. KREER, JR.

REFERENCES CITED

The following references are of record in the file of this patent:

UNITED STATES PATENTS

| Number | Name | Date |
| --- | --- | --- |
| 1,564,303 | Wold | Dec. 8, 1925 |
| 2,144,655 | Hahnle | Jan. 24, 1939 |
| 2,166,991 | Guanella | July 25, 1939 |
| 2,205,843 | Caruthers | June 25, 1940 |
| 2,305,614 | Goldstein | Dec. 22, 1942 |
| 2,333,322 | Levy | Nov. 2, 1943 |
| 2,403,727 | Loughren | July 9, 1946 |
| 2,410,386 | Miller | Oct. 29, 1946 |